Figure 1:
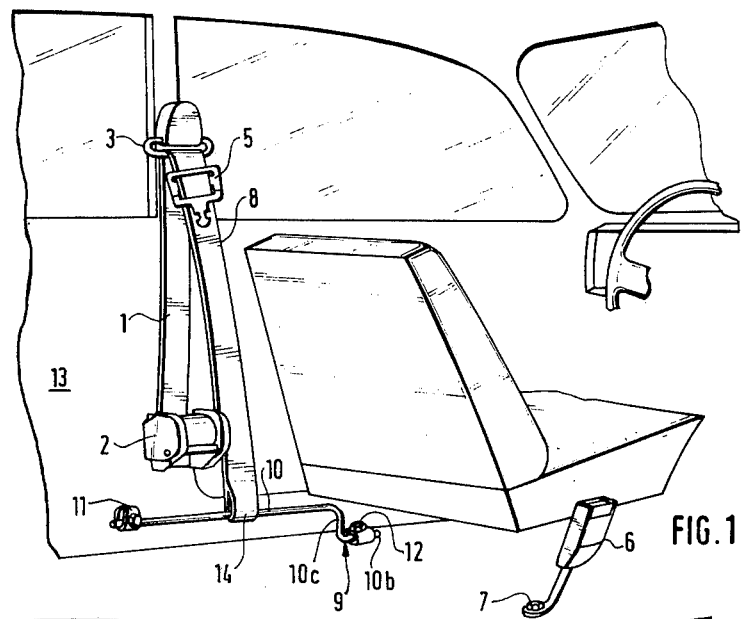

United States Patent [19]

Nilsson

[11] 4,244,601
[45] Jan. 13, 1981

[54] DEVICE IN CONNECTION WITH SAFETY BELTS FOR VEHICLES

[76] Inventor: Thomas Nilsson, Gästgivaregatan 5, 44020 Vårgårda, Sweden

[21] Appl. No.: 935,176
[22] Filed: Aug. 21, 1978
[51] Int. Cl.³ .......................................... B60R 21/08
[52] U.S. Cl. ................................. 280/805; 280/807; 280/808; 297/472
[58] Field of Search .............. 280/744, 745, 747, 801, 280/807, 808, 805; 297/468, 472, 473, 483

[56] References Cited

U.S. PATENT DOCUMENTS

| 3,328,080 | 6/1967 | Dall | 297/468 |
| 3,471,197 | 10/1969 | Ely | 297/483 |
| 3,941,419 | 3/1976 | Blom | 280/744 X |

FOREIGN PATENT DOCUMENTS

| 1231123 | 12/1966 | Fed. Rep. of Germany | 297/472 |
| 2323307 | 11/1974 | Fed. Rep. of Germany | 297/472 |
| 2607802 | 9/1977 | Fed. Rep. of Germany | 280/808 |
| 2705465 | 8/1978 | Fed. Rep. of Germany | 280/744 |
| 1248108 | 10/1960 | France | 297/473 |
| 166247 | 7/1921 | United Kingdom | 280/744 |
| 925700 | 5/1963 | United Kingdom | 280/808 |

Primary Examiner—John J. Love
Assistant Examiner—Michael Mar

[57] ABSTRACT

A device for anchoring a portion of a safety belt to the floor of a vehicle in the form of a bar extending in longitudinal direction of the vehicle along which a looped portion of a safety belt may move.

1 Claim, 2 Drawing Figures

DEVICE IN CONNECTION WITH SAFETY BELTS FOR VEHICLES

The present invention relates to a device for use in connection with safety belts for vehicles and of the kind, which has an anchoring to the floor at the side of the door of the vehicle for one of the band portions of the safety belt.

Safety belts of this kind made according to the prior art especially in connection with front seat safety belts for vehicles with two doors, often have the drawback that it has been difficult to obtain a correct and comfortable location of the anchoring point to the floor at the side of the door for the waist section of the safety belt, as seen from a security viewpoint, at the same time as an easy access to the rear seat of the vehicle is made possible without risk of tripping over the band of the belt. In connection with reel type belts it is customary that a band of the belt extends from an anchoring point located comparatively far away in the forward direction of the vehicle and to a direction-changing fitting on the door-post of the vehicle, which means that it extends over the rear corner portion of the door-opening.

It is a main object of the invention to provide a device in which the above mentioned drawbacks are eliminated, i.e. a device, which makes possible a suitable location of the point, where the belt reaches the body of the vehicle, when it is fastened, as well as to locate the position of this point so far back that the access to the rear seat is made possible without any obstruction of the band of the belt, when it is in released condition.

This object is reached by means of a device according to the invention, which is substantially characterized by the anchoring means to the floor having the shape of a track extending in the longitudinal direction of the vehicle, along which track the end portion of said band section can be guided in a displaceable manner.

Figure 2:
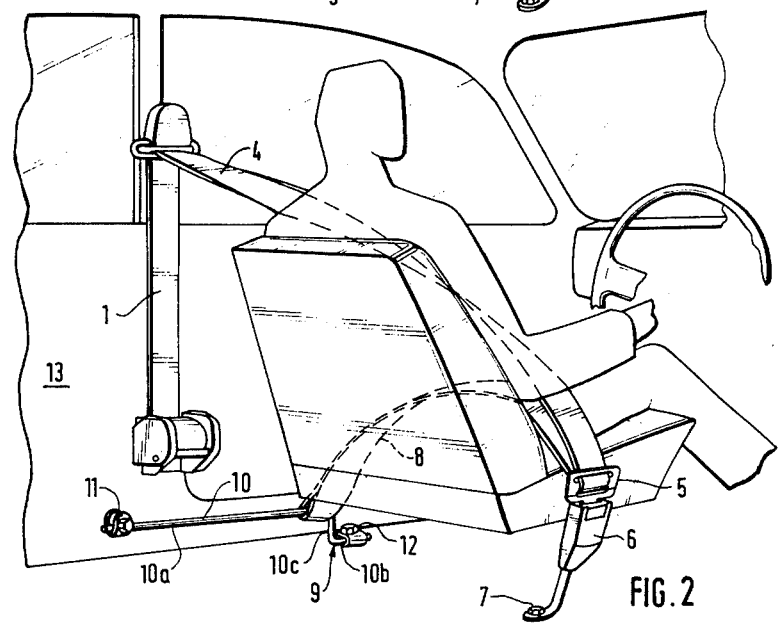

In the following an example of an embodiment of the invention will be described, reference being made to the accompanying drawing, in which FIG. 1 is a perspective view of a safety belt for vehicles equipped with the device according to the present invention in its parking position, i.e. when not in use, and FIG. 2 is a corresponding view of the same safety belt for vehicles in active condition, i.e. when it is fastened.

The safety belt for vehicles illustrated in the drawing is a so called reel-type belt of three-point type. The band forming part of the belt assembly with a portion 1 extends from a band reel provided quite close to the low portion of the rear edge of the opening of the door and to a direction-changing fitting 3 provided in the top portion of the rear edge of the opening of the door. Through this fitting the band is led in a sliding manner, and after which fitting the band becomes a chest band section, which lower down at the inside of the seat of the vehicle terminates at a coupling piece 5, which in known manner can be detachably coupled to a second coupling piece 6, which in its turn is attached to the center-tunnel or the foot board of the vehicle by means of a fitting 7 of attachment. The band of the belt is in an adjustable manner threaded through the coupling piece 5 and extends with a hip band portion 8 to a second floor anchoring device 9. The anchoring device 9 comprises a bar 10 extending in the longitudinal direction of the vehicle and is to the rear attached to the side 13 of the door of the vehicle by means of a clamping fitting 11 and is in its forward portion attached to the floor or the door-step of the vehicle by means of a second clamping fitting 12. The hip band section 8 is laid around the bar 10 by means of a loop-shaped end portion. In order to stand high loads and wear, the one portion of the hip section of the band, which is laid around the bar 10, has several layers. These layers are suitably obtained by folding of the band, in which connection the different layers are sewn together on the top side of the bar. The running loop 14 thus formed has a long extension in the longitudinal direction of the hip band section 8, which permits its easy movement along the bar. In order to provide a still further improved strength against wear, the loop 14 moreover can be provided with a lining of a wear-resisting material, which in addition will offer a good resistance against high loads. Also such a lining suitably ought to be provided with a hole of long extension extending in the longitudinal direction of the band. In the example of the embodiment shown the bar 10 is bent in z-shape, its rear portion 10a substantially being horizontal as is the case also with its low portion 10b. The portion 10b, however, is located on a lower level than the first mentioned portion and the transition between the two portions is shaped by a substantially vertical portion 10c. This means that when the safety belt is fastened the running loop 14 is in its forward position in contact against the portion 10c.

When upon releasing the belt the two coupling pieces 5, 6 are separated from each other, a stretching of the chest and hip band sections 4, 8 on account of the spring force of the winding-up device 2 takes place. The running loop 14 then automatically slides backwards along the bar 10 to the position illustrated in FIG. 1. If the winding-up device 2 is mounted to the door-side or if it is still further located to the rear relative to the position shown in the drawing, an additional rearwards displacement of the running loop can take place, which means that in released condition the safety belt will be completely moved backwards from the door-opening, so that a completely free access to the rear seat is permitted. When the safety belt is put on, there is also an automatic transition of the hip band portion 8 to the front position illustrated in FIG. 2.

The invention is not limited to the embodiment described above and illustrated in the drawing by way of example only, but can be varied as to its details within the scope of the following claims without departing from the fundamental idea of the invention. It is for example possible to give the bar 10 another bend, if this is considered suitable. By way of example the rear portion can be turned upwards and be coupled to the winding-up device 2. It is likewise possible to give the whole bar portion 10a another inclination. The attachment of the bar 10 to the vehicle instead of the fittings 11, 12 to be attached by means of screws can comprise holes made in the body of the vehicle, by way of example a forwardly located hole in the foot plate of the vehicle or the door-step of the vehicle and a hole located to the rear, which by way of example can be made in the partition wall, which usually is a feature of the construction at the front edge of the rear seat. It can also be suitable to design the bar 10 in such a manner that it has somewhat yielding properties while taking up energy, when the vehicle is subjected to abnormal braking forces, for example in connection with collisions. It may be a solution to provide this absorption of energy by designing the bar with a bend inside of said partition wall at the rear seat, so that the bar under deformation can be drawn out of this partition wall.

I claim:

1. In a vehicle: a vehicle body having a floor, a seat and a door post, a safety belt having a retractor device and being looped through connecting means at said door post one end of said belt being connected to said retractor device, and means for attaching said safety belt to said vehicle body, said attaching means including a substantially stiff bar which is deformable when subjected to a high load and extending substantially horizontally near said floor and substantially in driving direction of said vehicle behind said seat and having front and rear ends connected to said vehicle body, the other end said safety belt having a portion forming a loop around said bar, said belt having a width considerably narrower than the length of said bar so that said loop is adapted to move along said bar, said loop having a width transverse to said bar which is large compared to the transverse size of said bar whereby when said safety belt is in use, said loop is drawn to the front end of said bar and when said safety belt is not in use, said loop is drawn towards the rear end of said bar.

* * * * *

UNITED STATES PATENT AND TRADEMARK OFFICE
CERTIFICATE OF CORRECTION

PATENT NO. : 4,244,601

DATED : Jan. 13, 1981

INVENTOR(S) : Thomas Nilsson

It is certified that error appears in the above-identified patent and that said Letters Patent are hereby corrected as shown below:

[30] Foreign Application Priority Data

Aug. 23, 1977 [SE] Sweden ............7709451

Signed and Sealed this

First Day of September 1981

[SEAL]

Attest:

GERALD J. MOSSINGHOFF

Attesting Officer       Commissioner of Patents and Trademarks